(12) United States Patent
Mehrotra et al.

(10) Patent No.: US 12,574,814 B2
(45) Date of Patent: Mar. 10, 2026

(54) OPTIMIZED S1-X2 HANDOVERS

(71) Applicant: Parallel Wireless, Inc., Nashua, NH (US)

(72) Inventors: Shivani Mehrotra, Nashua, NH (US); Mahendra Singh Rajput, Bangalore (IN); Chirag Makwana, Pune (IN); Salil Sahasrabudhe, Pune (IN); Pradeep Sachdeva, Pune (IN)

(73) Assignee: Parallel Wireless, Inc., Nashua, NH (US)

( * ) Notice: Subject to any disclaimer, the term of this patent is extended or adjusted under 35 U.S.C. 154(b) by 586 days.

(21) Appl. No.: 17/878,853

(22) Filed: Aug. 1, 2022

(65) Prior Publication Data

US 2023/0030933 A1     Feb. 2, 2023

Related U.S. Application Data

(60) Provisional application No. 63/227,515, filed on Jul. 30, 2021.

(51) Int. Cl.
H04W 36/00     (2009.01)
H04W 92/20     (2009.01)

(52) U.S. Cl.
CPC ........ H04W 36/0064 (2023.05); H04W 92/20 (2013.01)

(58) Field of Classification Search
CPC . H04W 80/04; H04W 36/18; H04W 36/0011; H04W 36/14; H04W 36/08;
(Continued)

(56) References Cited

U.S. PATENT DOCUMENTS 7,181,221 B1 * 2/2007 Mark ................... H04W 16/18
                                                              455/436
2006/0176855 A1 * 8/2006 Oh ...................... H04W 36/302
                                                              370/331
(Continued)

FOREIGN PATENT DOCUMENTS

WO     WO 2019/072902 A1 *   4/2019   ........... H04W 36/00

OTHER PUBLICATIONS

LTE; Evolved Universal Terrestrial Radio Access Network (E-UTRAN); S1 Application Protocol (S1AP) (3GPP TS 36.413 version 15.3.0 Release 15), Sep. 2018.
(Continued)

*Primary Examiner* — Peter G Solinsky
*Assistant Examiner* — Sanjay K Dewan
(74) *Attorney, Agent, or Firm* — Michael Y. Saji

(57)     ABSTRACT

A system is disclosed to enhance HNG X2GW node in a way so that it supports the optimized S1-X2 Handovers with loosely coupled SON module. X2GW module in HNG interworks with SON module to provide interface for/ towards SON module to update the information required for X2 association management. On receiving cell information from CWS, SON updates the X2GW with additional parameters required for creating/updating X2 association. When SON receives UE measurement report from CWS, it updates the same to X2GW with neighbor information to take further action. For S1-X2 handover where SON has not notified X2GW of neighbor relation between CWS and Macro eNodeB, HNG continues sending Handover over S1. X2GW views SON as a DB which holds Cell Neighbor Related information and keeps updating x2 learnt neighbours using well defined API's towards SON.

10 Claims, 9 Drawing Sheets

(58) Field of Classification Search
  CPC ............. H04W 36/0064; H04W 92/20; H04W
                              36/0055
  USPC ........................................................ 370/331
  See application file for complete search history.

(56)                  References Cited

U.S. PATENT DOCUMENTS

| | | | | |
|---|---|---|---|---|
| 2007/0002796 A1* | 1/2007 | Horn | ................. | H04W 36/0064 |
| | | | | 370/400 |
| 2009/0257402 A1* | 10/2009 | Zhu | ....................... | H04W 36/08 |
| | | | | 455/436 |
| 2013/0086202 A1* | 4/2013 | Connelly | ................... | G06F 8/61 |
| | | | | 709/217 |
| 2018/0376390 A1* | 12/2018 | Gemelos | ........... | H04W 36/0016 |
| 2023/0090416 A1* | 3/2023 | Crawford | ............. | H04L 9/3239 |
| | | | | 370/331 |
| 2023/0092337 A1* | 3/2023 | Erta | ................. | H04W 36/0016 |
| | | | | 370/331 |
| 2023/0171662 A1* | 6/2023 | Moreno | ........... | H04W 36/0061 |
| | | | | 370/331 |
| 2024/0143387 A1* | 5/2024 | Brinkhoff | ............. | G06F 11/328 |

OTHER PUBLICATIONS

LTE; Evolved Universal Terrestrial Radio Access Network (E-UTRAN);
X2 Application Protocol (X2AP) (3GPP TS 36.423 version 12.3.0
Release 12), Sep. 2014.

* cited by examiner

OPTIMIZED S1-X2 HANDOVERS

CROSS-REFERENCE TO RELATED APPLICATIONS

This application claims priority under 35 U.S.C. § 119(e) to U.S. Provisional Pat. App. No. 63/227,515, filed Jul. 30, 2021, and titled "Optimized S1-X2 Handovers," which is hereby incorporated by reference in its entirety for all purposes. In addition, this application hereby incorporates by reference, for all purposes, each of the following U.S. Patent Application Publications in their entirety: US20170013513A1; US20170026845A1; US20170055186A1; US20170070436A1; US20170077979A1; US20170019375A1; US20170111482A1; US20170048710A1; US20170127409A1; US20170064621A1; US20170202006A1; US20170238278A1; US20170171828A1; US20170181119A1; US20170273134A1; US20170272330A1; US20170208560A1; US20170288813A1; US20170295510A1; US20170303163A1; and US20170257133A1. This application also hereby incorporates by reference U.S. Pat. No. 8,879,416, "Heterogeneous Mesh Network and Multi-RAT Node Used Therein," filed May 8, 2013; U.S. Pat. No. 9,113,352, "Heterogeneous Self-Organizing Network for Access and Backhaul," filed Sep. 12, 2013; U.S. Pat. No. 8,867,418, "Methods of Incorporating an Ad Hoc Cellular Network Into a Fixed Cellular Network," filed Feb. 18, 2014; U.S. patent application Ser. No. 14/034,915, "Dynamic Multi-Access Wireless Network Virtualization," filed Sep. 24, 2013; U.S. patent application Ser. No. 14/289,821, "Method of Connecting Security Gateway to Mesh Network," filed May 29, 2014; U.S. patent application Ser. No. 14/500,989, "Adjusting Transmit Power Across a Network," filed Sep. 29, 2014; U.S. patent application Ser. No. 14/506,587, "Multicast and Broadcast Services Over a Mesh Network," filed Oct. 3, 2014; U.S. patent application Ser. No. 14/510,074, "Parameter Optimization and Event Prediction Based on Cell Heuristics," filed Oct. 8, 2014, U.S. patent application Ser. No. 14/642,544, "Federated X2 Gateway," filed Mar. 9, 2015, and U.S. patent application Ser. No. 14/936,267, "Self-Calibrating and Self-Adjusting Network," filed Nov. 9, 2015; U.S. patent application Ser. No. 15/607,425, "End-to-End Prioritization for Mobile Base Station," filed May 26, 2017; U.S. patent application Ser. No. 15/803,737, "Traffic Shaping and End-to-End Prioritization," filed Nov. 27, 2017, each in its entirety for all purposes. This document also hereby incorporates by reference U.S. Pat. Nos. 9,107,092, 8,867,418, and 9,232,547 in their entirety. This document also hereby incorporates by reference U.S. patent application Ser. No. 14/822,839, U.S. patent application Ser. No. 15/828,427, U.S. Pat. App. Pub. Nos. US20170273134A1, US20170127409A1 in their entirety.

BACKGROUND

In the LTE radio access technology, as defined by the Third Generation Partnership Project (3GPP), an S1 interface is used between a base station (an eNodeB) and the core network to perform user equipment (UE) handovers, and, an X2 interface is used between an eNodeB and other peer eNodeBs to communicate relevant information. It is possible in the prior art to perform handovers between eNodeBs that utilize the X2 interface to speed up handover, instead of using the S1 interface exclusively.

Recently, virtual machines and virtual environments, often using hypervisors, containers or other virtualization technologies, having been developed in the broader technology world, have started to see adoption amongst the telecom industry. These virtual machines operate to provide the functionality previously made available on dedicated hardware, and communicate over the network as if deployed on dedicated hardware, but however are easier to maintain, configure, fail over, etc. as a result of having a narrow scope of definition for the specific services that run on each virtual machine.

Radio networks require the use of compute, called baseband processing, to process radio frequency signals and turn them into digital data. This compute has traditionally been located on-node but in recent days is migrating to the base of the tower, if not further away using the use of high-speed data links and virtual machine technology. Fronthaul networks are the networks that are used to share radio samples to the RF baseband.

SUMMARY

A system is disclosed to enhance HNG X2GW node in a way so that it supports the optimized S1-X2 Handovers with loosely coupled SON module. X2GW module in HNG interworks with SON module to provide interface for/towards SON module to update the information required for X2 association management. On receiving cell information from CWS, SON updates the X2GW with additional parameters required for creating/updating X2 association. When SON receives UE measurement report from CWS, it updates the same to X2GW with neighbor information to take further action. For S1-X2 handover where SON has not notified X2GW of neighbor relation between CWS and Macro eNodeB, HNG continues sending Handover over S1. X2GW views SON as a DB which holds Cell Neighbor Related information and keeps updating x2 learnt neighbours using well defined API's towards SON.

DETAILED DESCRIPTION

The present disclosure relates to a particular architecture wherein a coordinating server, identified herein as an HNG, is located between a core network and a radio access network (RAN) and is used to provide a variety of functions for the core and the RAN, in some embodiments. A coordinating server may provide coordinating functions, such as SON (self-organizing network), which loosely is understood to mean a function that catalogs the attached RAN nodes and is capable of turning on and off certain functionality, up to and including the entire RAN. The coordinating node may provide multi-RAT functionality, in some embodiments, which may include 4G/5G interworking or interworking between different networks, protocols, or technologies.

Figure 1:
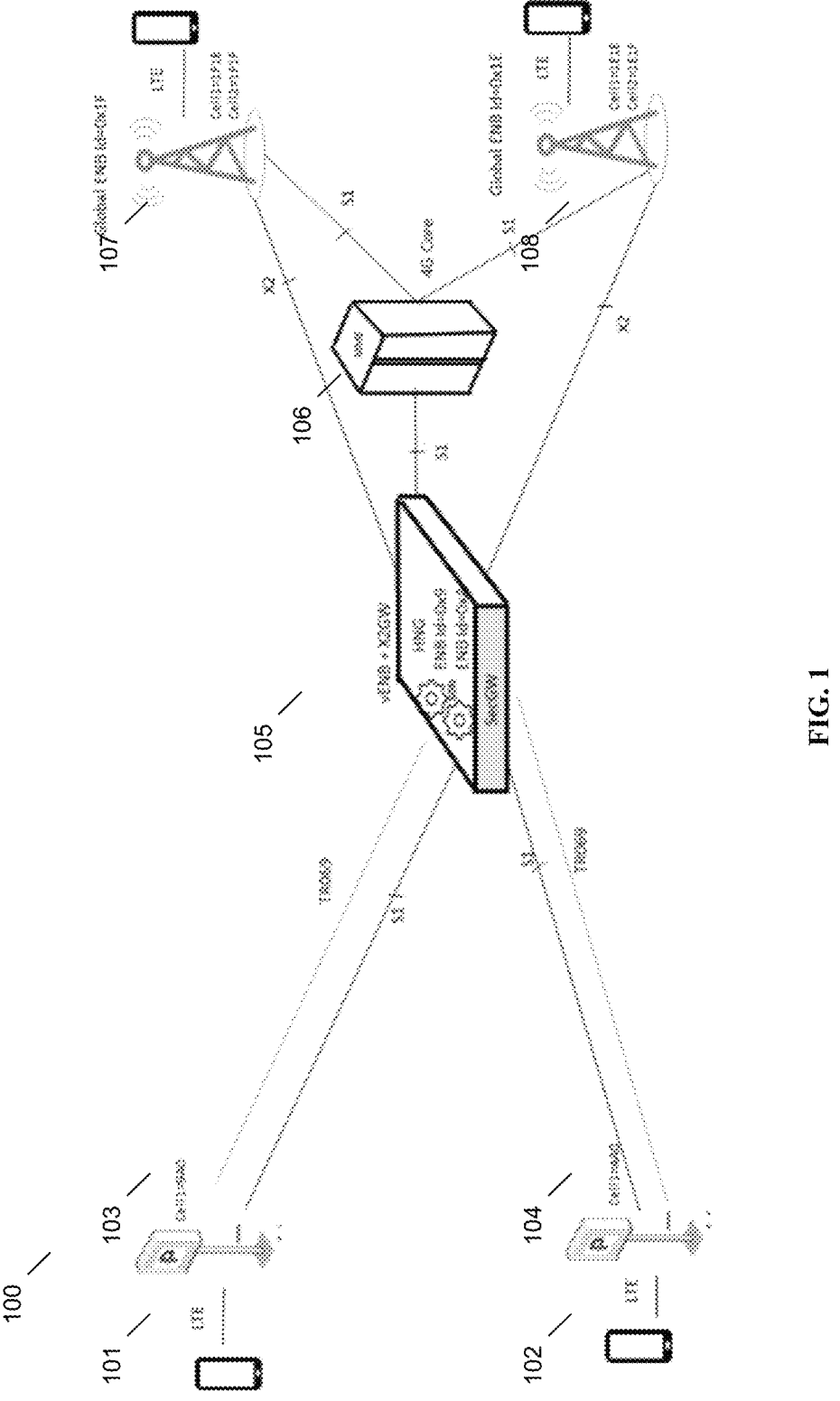
FIG. 1 shows a schematic network architecture diagram with a coordinating server, in accordance with some embodiments.

FIG. 1 shows a schematic network architecture diagram with a coordinating server, in accordance with some embodiments. LTE UEs 101 and 102 are attached to eNodeBs 103, 104, which in turn are associated with coordinating node 105. Coordinating node 105 is referred to as an HNG. Coordinating node 105 includes a virtual eNodeB (vENB) functionality, an X2 gateway (X2GW) functionality, a security gateway (SecGW) functionality, and a SON functionality, in some embodiments. Coordinating node 105 is a gateway, in some embodiments. Coordinating node 105 also provides S1 interface connectivity to a 4G core and MME to eNodeBs 103, 104, as well as X2 interface connectivity (via X2GW functionality) to macro eNodeBs 107, 108, which each have their own UEs attached as well.

An X2GW module in HNG interworks with SON module to provide interface for/towards SON module to update the information required for X2 association management. On receiving cell information from CWS, SON updates the X2GW with additional parameters required for creating/updating X2 association. When SON receives UE measurement report from CWS, it updates the same to X2GW with neighbor information to take further action.

For S1-X2 handover where SON has not notified X2GW of neighbor relation between CWS and Macro eNodeB, HNG continues sending Handover over S1. X2GW views SON as a DB which holds Cell Neighbor Related information and keeps updating x2 learnt neighbors using well defined API's towards SON.

A system is disclosed to enhance HNG X2GW node in a way so that it supports the optimized S1-X2 Handovers with loosely coupled SON module instead of tightly coupled. Call flows for X2 link establishment using this approach are given herein.

One typical approach uses the tight coupling between HNG and SON for exchange of CWS cell information between CWS and HNG which is used to establish X2 associations. To provide more scalability, failover, etc, this tight coupling has been removed so that one SONMGR can serve multiple HNGs simultaneously, in some embodiments.

As a result, there is no obvious way to create X2 associations between HNG and Macro ENB Nodes and Optimized S1-X2 Handover shall not work. This shall result in more signaling for each handover as opposed to the optimized approach where X2 links can be used for subsequent Handovers.

According to the idea presented in this disclosure, X2GW learns the VNODE served cell information from S1AP Handover required message initiated from VNODE and initiate X2 Association setup with the core side handover target node.

This node could be a core side Macro or another VNODE on different VeNB/HNG. The PCI/EARFN of serving cell of VNode is retrieved from S1-HO Required message.

Neighbor information of learnt cell will not be present in x2 setup request, as target cell PCI and EARFCN is not known at this point. To retrieve PCI and EARFCN of target cell, TNL request is sent to Macro via MME. Macro responds with TNL response with X2-IP of Macro. X2GW shall initiate the X2-Setup towards Macro via the target IP with served cell and learnt PCI/EARFCN. Macro shall respond with X2-Setup response thereby establishing the X2 link between X2GW and Macro.

After X2 association is setup with the peer Macro, all further S1AP handovers from VNODE cell informed in X2 association setup shall be converted to X2AP Handover on core side by X2GW improving the overall system performance.

Following are few call flows explaining X2AP association setup and X2AP ENB Configuration Update with Macro eNB Node. CWS as used herein refers to an enhanced eNodeB in accordance with some embodiments. Macro eNodeB as used herein refers to a standard eNodeB that is not managed by the coordinating node described herein.

Figure 2:
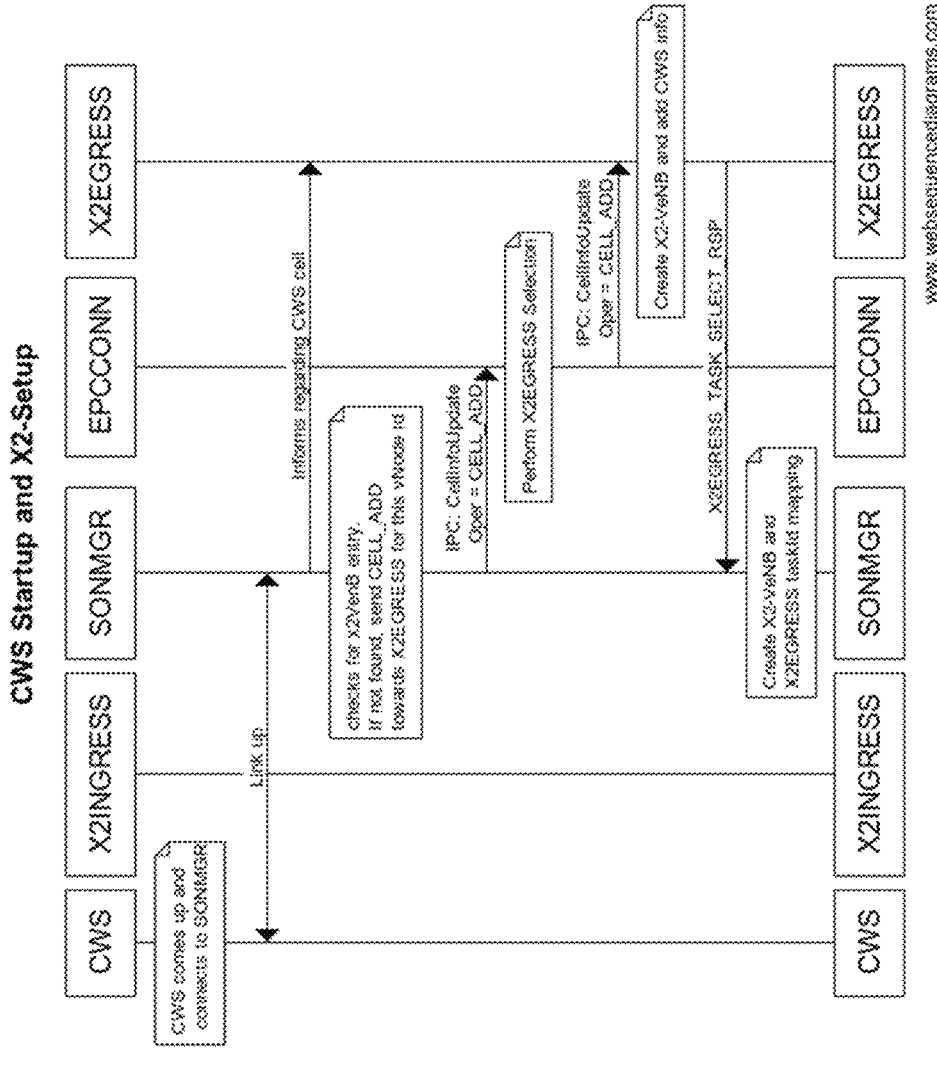
FIG. 2 shows a call flow for an enhanced eNodeB startup, in accordance with some embodiments.

FIG. 2 shows an enhanced base station in startup, in accordance with some embodiments. As shown in FIG. 2 at 200, X2INGRESS, SONMGR, EPCONN, and X2EGRESS are functions provided at the coordinating node 105. Coordinating node 105 is able to provide virtualization for each of the functions hosted thereat such that these functions can be based on different physical machines or on different networks.

When the eNodeB comes up and connects to coordinating node 105, the coordinating node looks in an internal table for an x2vEnB entry. If not found, this cell address CELL_ADD is mapped to a particular X2 egress cell address, shown as "IPC: CellInfoUpdate; Oper=CELL_ADD" in the figure. This setup is subsequently cached and reused.

Figure 3:
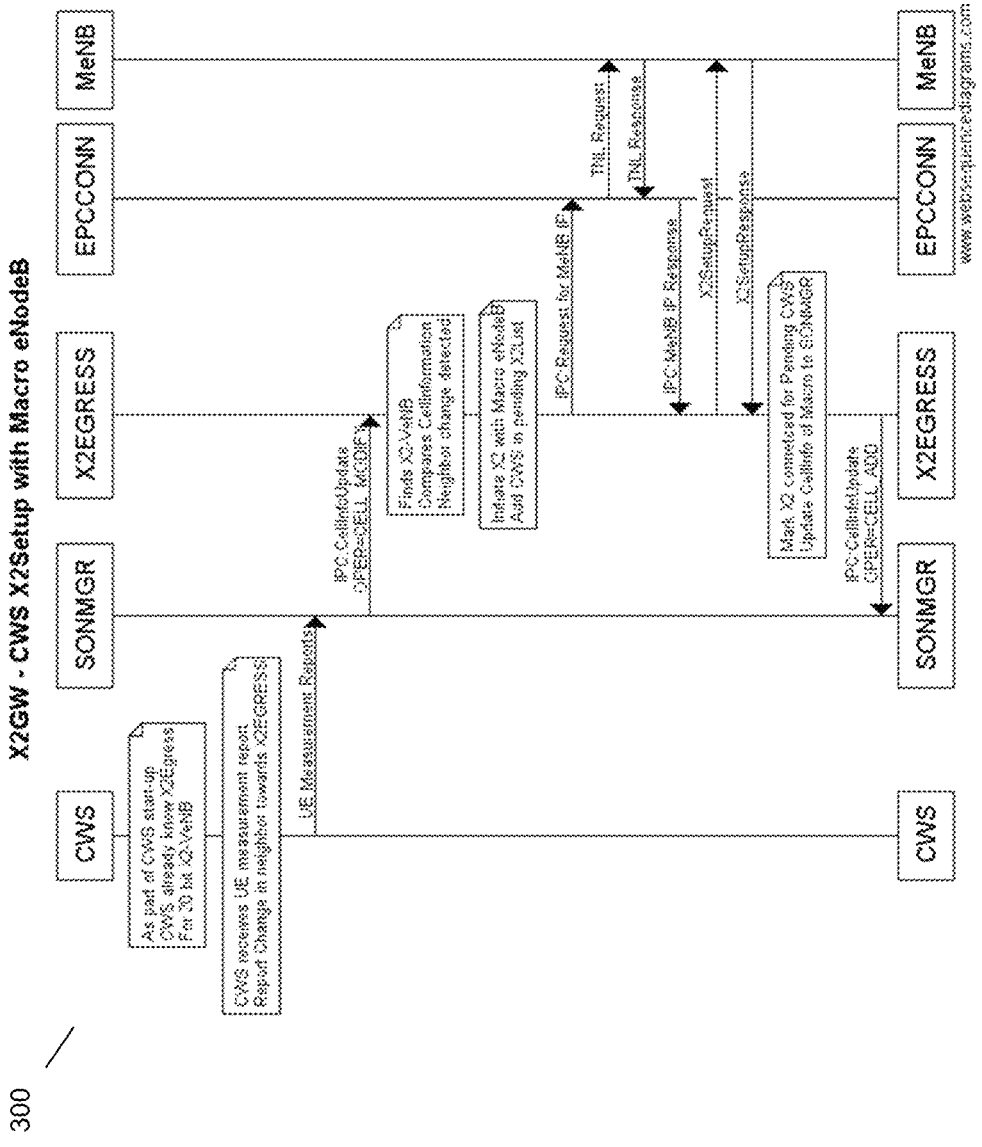
FIG. 3 shows a call flow for an enhanced eNodeB X2 setup with a macro eNodeB, in accordance with some embodiments.

Continuing on, FIG. 3 shows an enhanced base station that has been configured with the coordinating node and is subsequently being set up for X2 connection with another macro eNB. As shown at 300, the base station has already set up an X2EGRESS cache entry. When the enhanced base station receives a measurement report from an attached UE informing it that there is another macro eNB in close proximity, the coordinating node uses the existing X2EGRESS function's cached information for the enhanced base station and sets up, by proxy, the X2 connection with the macro eNB. The X2EGRESS function updates the SONMGR function with "IPC:CellInfoUpdate OPER=CELL_ADD" for this particular enhanced ENB (CWS). The X2EGRESS function is responsible for enabling the coupling between the CWS and the SONMGR and the present disclosure identifies the functional separation between SONMGR and X2EGRESS that allows these two functions to be virtualized separately, thereby enabling improved failover, resiliency, scalability, and other desirable modern characteristics of a cloud-based virtual function.

Figure 4:
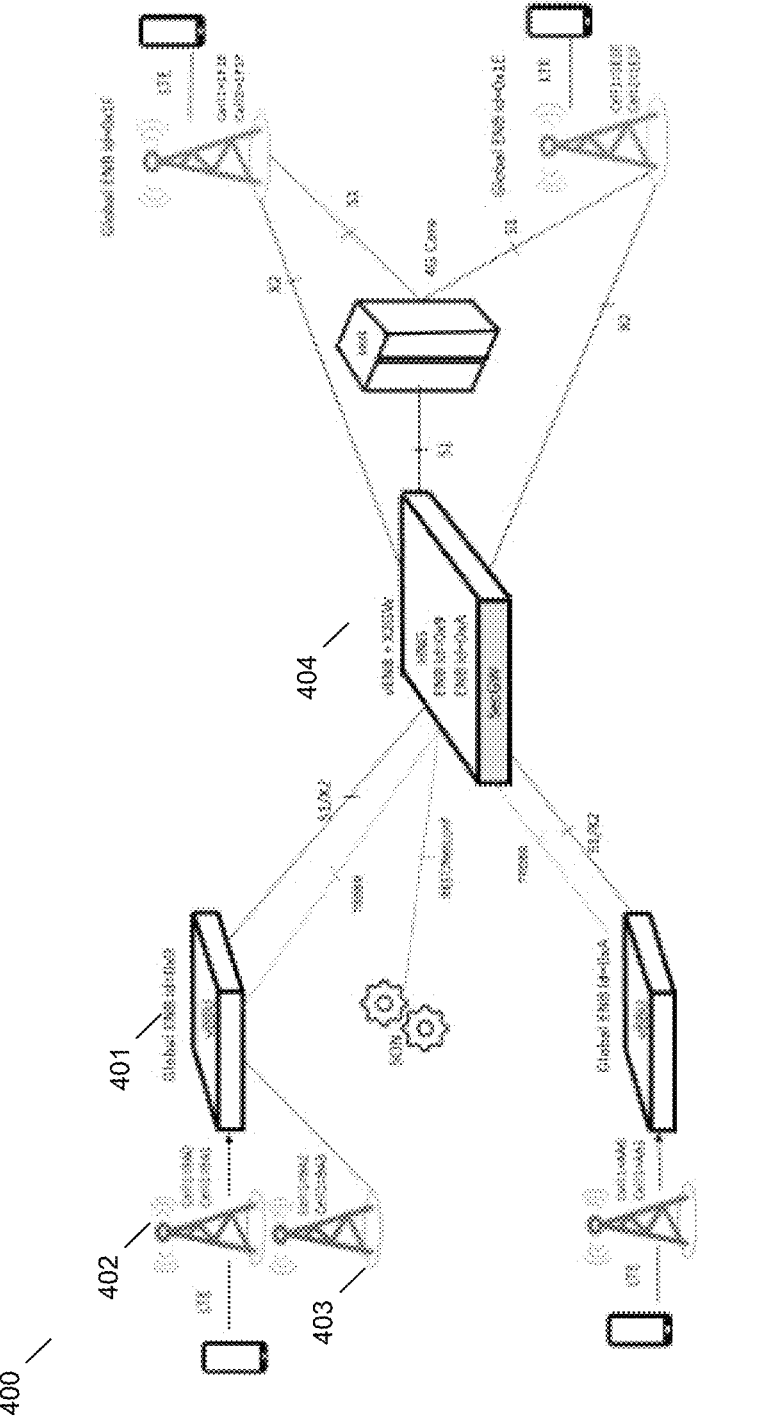
FIG. 4 shows a further schematic network architecture diagram with a coordinating server, in accordance with some embodiments.

FIG. 4 shows a further schematic network architecture, in accordance with some embodiments. In FIG. 4, a different network architecture is shown with a vBBU 401, wherein the vBBU 401 provides cloud baseband for two base stations 402, 403, using the same or different RAT. These may be 4G, 5G, different bands, etc. Fronthaul may be fiber, microwave, or another fronthaul. The operation of coordinating gateway 404 is analogous to that described above and the coordinating gateway 404 enables S1/X2 handover to both base station 402 and 403.

Figure 5:
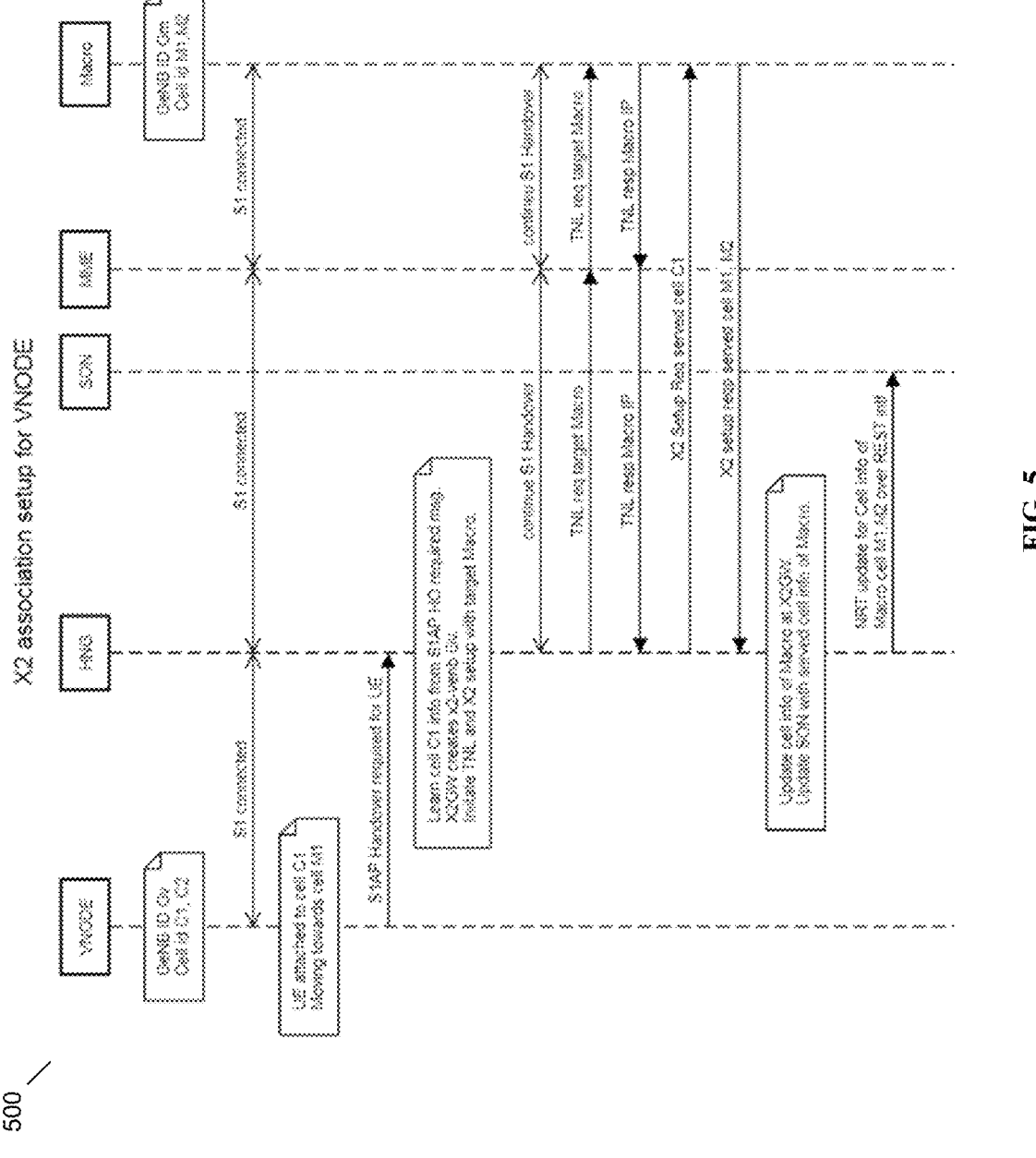
FIG. 5 shows an X2 association setup for a virtual eNodeB, in accordance with some embodiments.

FIG. 5 shows an X2 association setup for VNODE, in accordance with some embodiments. Notably, when S1AP handover is required for UE, the HNG (coordinating gateway) learns cell C1 info from S1AP HO required msg, caches it, and then X2GW creates x2-venb GV. The HNG then initiate TNL and X2 setup with target Macro.

Figure 6:
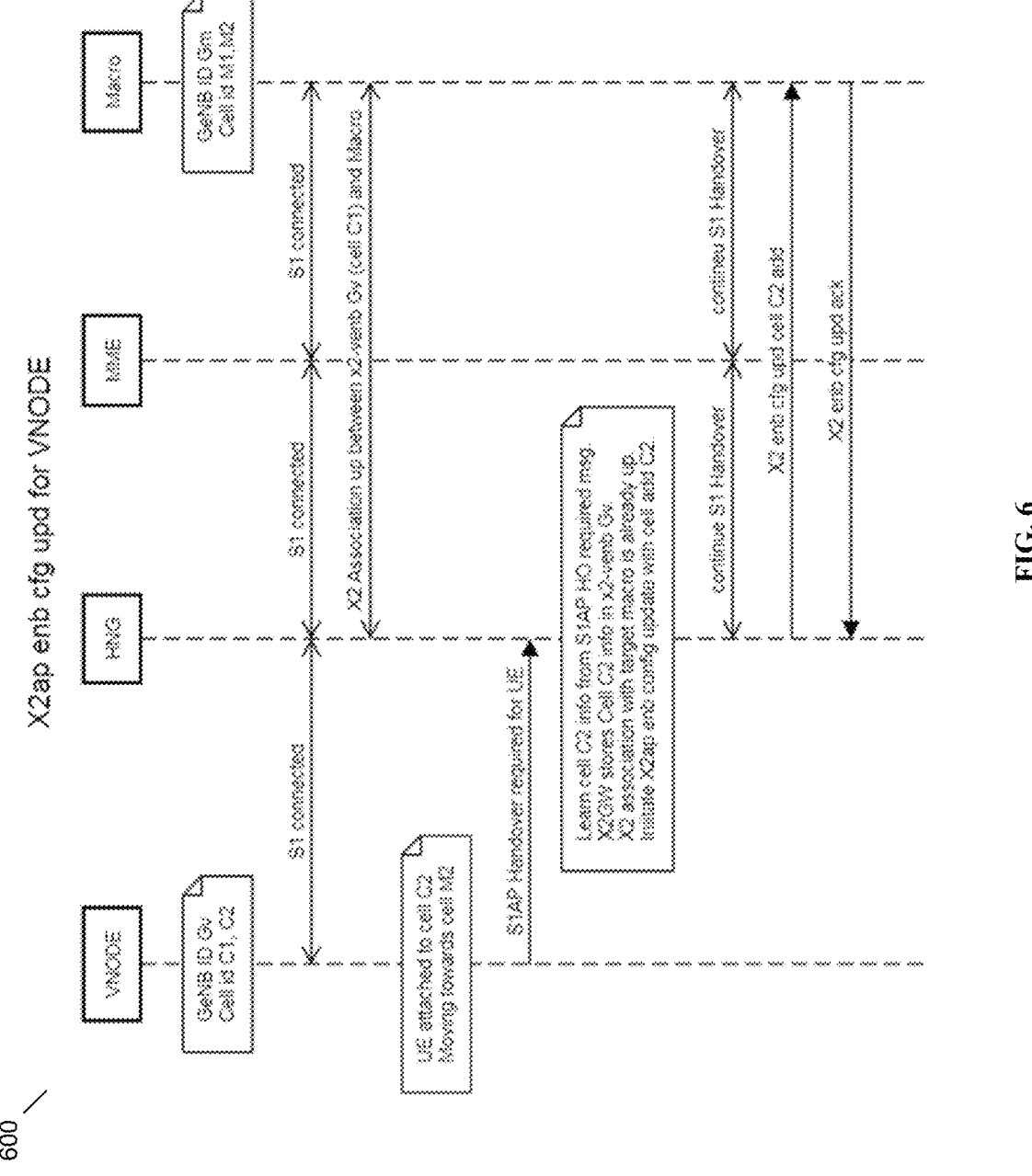
FIG. 6 shows an X2AP eNodeB configuration update for a virtual eNodeB, in accordance with some embodiments.

FIG. 6 shows an X2AP eNodeB configuration update for a virtual eNodeB, in accordance with some embodiments. Notably the HNG (coordinating gateway) learns the cell C2 info from the S1AP HO required message, and the X2GW stores Cell C2 info in x2-venb Gu. X2 association with target macro is already Up. The HNG initiates X2ap enb config update with a CELL ADD C2 message.

It should be appreciated that this could be implemented with a virtual base station of any type, whether using containers, hypervisors, virtual machines, or another virtualization technology, and with virtual base stations supporting various RATs, specifically including 2G, 3G, 4G, 5G.

Figure 7:
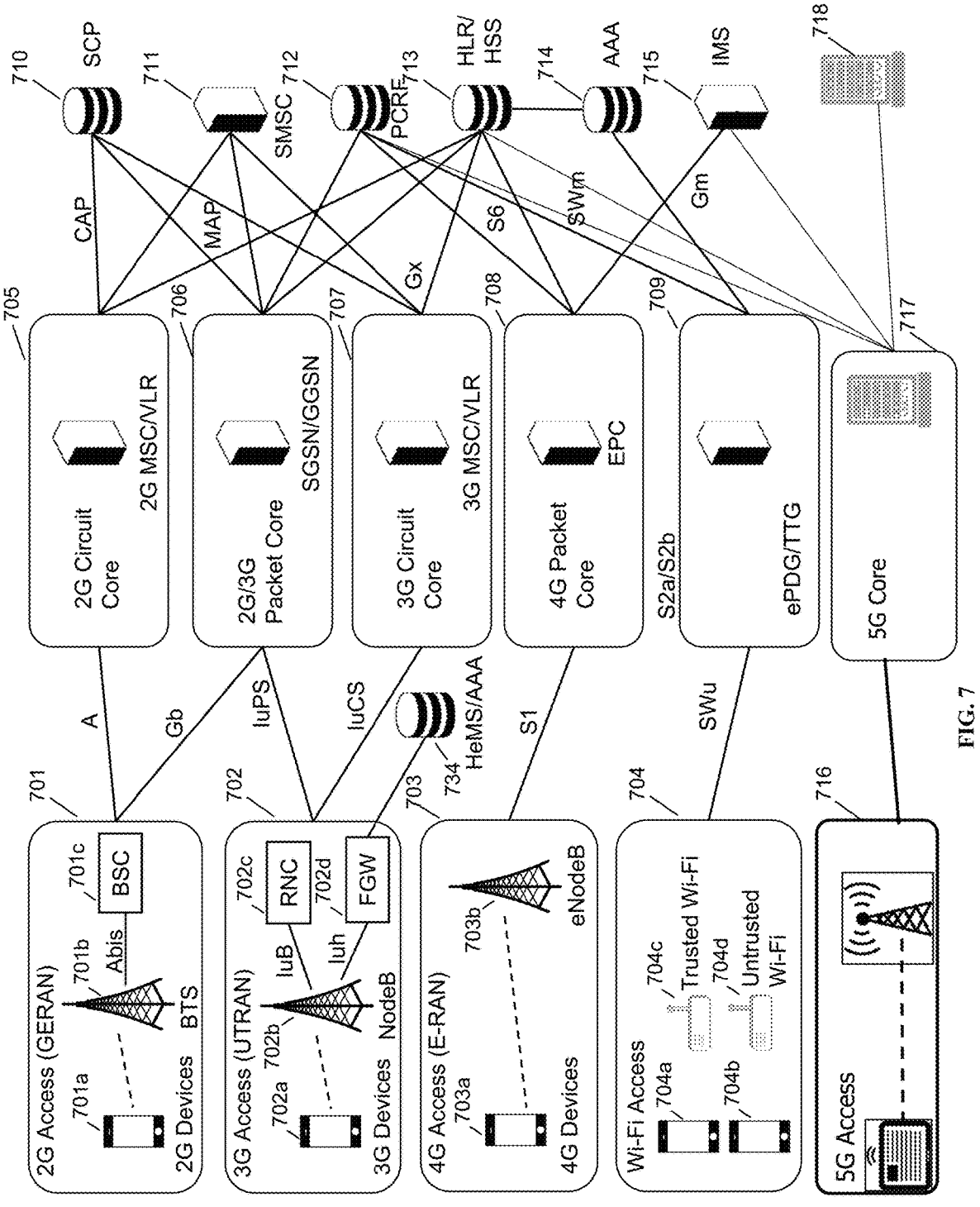
FIG. 7 shows a schematic network architecture diagram for 4G and other-G networks, in accordance with some embodiments.

FIG. 7 shows a schematic network architecture diagram for 3G and other-G networks, in accordance with some embodiments. The diagram shows a plurality of "Gs," including 2G, 3G, 4G, 5G and Wi-Fi. 2G is represented by GERAN 701, which includes a 2G device 701*a*, BTS 701*b*, and BSC 701*c*. 3G is represented by UTRAN 702, which includes a 3G UE 702*a*, nodeB 702*b*, RNC 702*c*, and femto gateway (FGW, which in 3GPP namespace is also known as a Home nodeB Gateway or HNBGW) 702*d*. 4G is represented by EUTRAN or E-RAN 703, which includes an LTE UE 703*a* and LTE eNodeB 703*b*. Wi-Fi is represented by Wi-Fi access network 704, which includes a trusted Wi-Fi access point 704*c* and an untrusted Wi-Fi access point 704*d*. The Wi-Fi devices 704*a* and 704*b* may access either AP 704*c* or 704*d*. In the current network architecture, each "G" has a core network. 2G circuit core network 705 includes a 2G MSC/VLR; 2G/3G packet core network 706 includes an SGSN/GGSN (for EDGE or UMTS packet traffic); 3G circuit core 707 includes a 3G MSC/VLR; 4G circuit core 708 includes an evolved packet core (EPC); and in some embodiments the Wi-Fi access network may be connected via an ePDG/TTG using S2a/S2b. Each of these nodes are connected via a number of different protocols and interfaces, as shown, to other, non-"G"-specific network nodes, such as the SCP 730, the SMSC 731, PCRF 732, HLR/HSS 733, Authentication, Authorization, and Accounting server (AAA) 734, and IP Multimedia Subsystem (IMS) 735. An HeMS/AAA 736 is present in some cases for use by the 3G UTRAN. The diagram is used to indicate schematically the basic functions of each network as known to one of skill in the art, and is not intended to be exhaustive. For example, 5G core 717 is shown using a single interface to 5G access 716, although in some cases 5G access can be supported using dual connectivity or via a non-standalone deployment architecture.

Noteworthy is that the RANs 701, 702, 703, 704 and 736 rely on specialized core networks 705, 706, 707, 708, 709, 737 but share essential management databases 730, 731, 732, 733, 734, 735, 738. More specifically, for the 2G GERAN, a BSC 701*c* is required for Abis compatibility with BTS 701*b*, while for the 3G UTRAN, an RNC 702*c* is required for Iub compatibility and an FGW 702*d* is required for Iuh compatibility. These core network functions are separate because each RAT uses different methods and techniques. On the right side of the diagram are disparate functions that are shared by each of the separate RAT core networks. These shared functions include, e.g., PCRF policy functions, AAA authentication functions, and the like. Letters on the lines indicate well-defined interfaces and protocols for communication between the identified nodes.

The system may include 5G equipment. The present invention is also applicable for 5G networks since the same or equivalent functions are available in 5G. 5G networks are digital cellular networks, in which the service area covered by providers is divided into a collection of small geographical areas called cells. Analog signals representing sounds and images are digitized in the phone, converted by an analog to digital converter and transmitted as a stream of bits. All the 5G wireless devices in a cell communicate by radio waves with a local antenna array and low power automated transceiver (transmitter and receiver) in the cell, over frequency channels assigned by the transceiver from a common pool of frequencies, which are reused in geographically separated cells. The local antennas are connected with the telephone network and the Internet by a high bandwidth optical fiber or wireless backhaul connection.

5G uses millimeter waves which have shorter range than microwaves, therefore the cells are limited to smaller size. Millimeter wave antennas are smaller than the large antennas used in previous cellular networks. They are only a few inches (several centimeters) long. Another technique used for increasing the data rate is massive MIMO (multiple-input multiple-output). Each cell will have multiple antennas communicating with the wireless device, received by multiple antennas in the device, thus multiple bitstreams of data will be transmitted simultaneously, in parallel. In a technique called beamforming the base station computer will continuously calculate the best route for radio waves to reach each wireless device, and will organize multiple antennas to work together as phased arrays to create beams of millimeter waves to reach the device.

Figure 8:
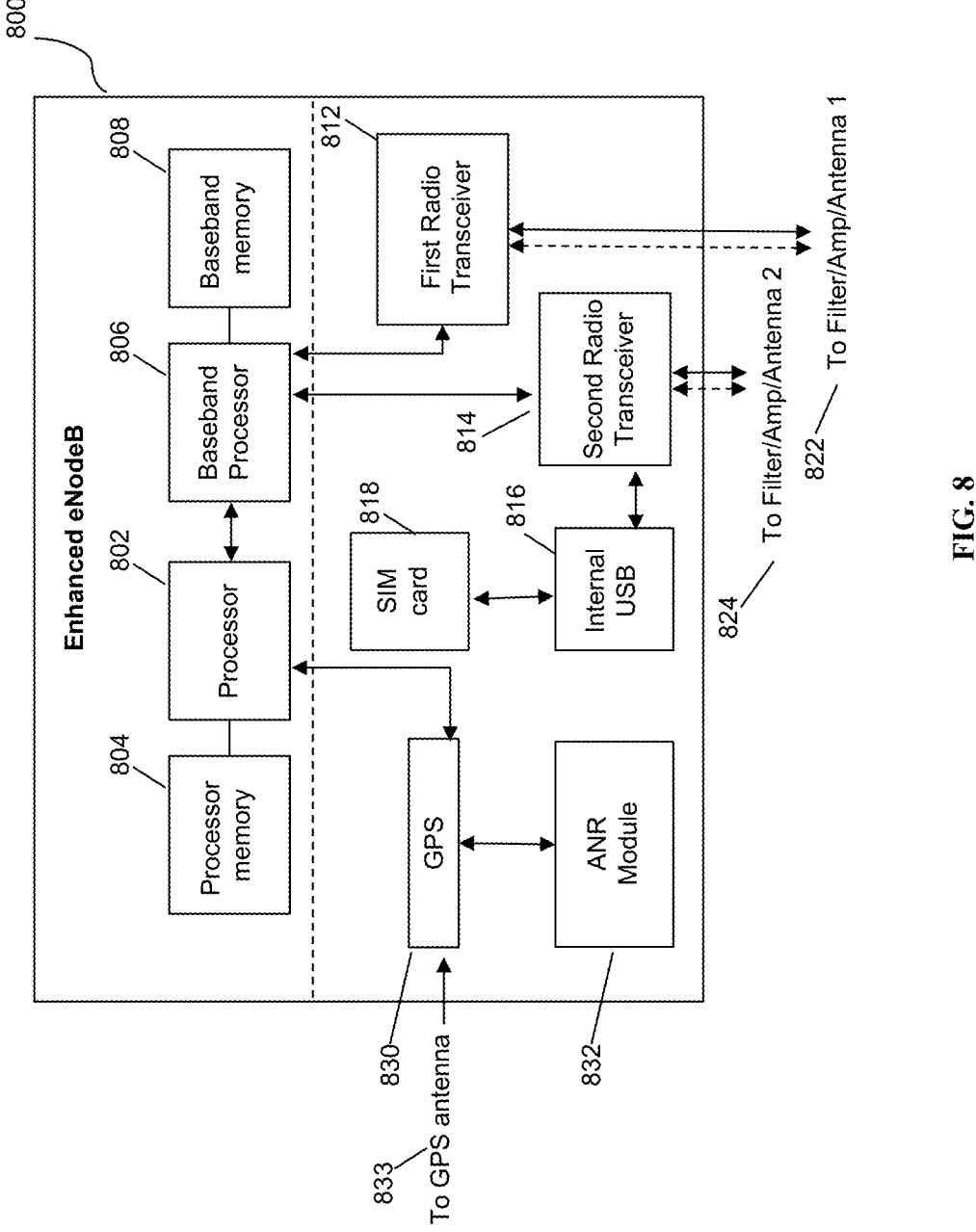
FIG. 8 shows an enhanced eNodeB for performing the methods described herein, in accordance with some embodiments.

FIG. 8 shows an enhanced eNodeB for performing the methods described herein, in accordance with some embodiments. Where an eNodeB is shown herein, a gNodeB or other RAT base station may also be understood to be disclosed, with Xx/Xn being used in place of X2 for gNB, etc. eNodeB 800 may include processor 802, processor memory 804 in communication with the processor, baseband processor 806, and baseband processor memory 808 in communication with the baseband processor. Mesh network node 800 may also include first radio transceiver 812 and second radio transceiver 814, internal universal serial bus (USB) port 816, and subscriber information module card (SIM card) 818 coupled to USB port 816. In some embodiments, the second radio transceiver 814 itself may be coupled to USB port 816, and communications from the baseband processor may be passed through USB port 816. The second radio transceiver may be used for wirelessly backhauling eNodeB 800.

Processor 802 and baseband processor 806 are in communication with one another. Processor 802 may perform routing functions, and may determine if/when a switch in network configuration is needed. Baseband processor 806 may generate and receive radio signals for both radio transceivers 812 and 814, based on instructions from processor 802. In some embodiments, processors 802 and 806 may be on the same physical logic board. In other embodiments, they may be on separate logic boards.

Processor 802 may identify the appropriate network configuration, and may perform routing of packets from one network interface to another accordingly. Processor 802 may use memory 804, in particular to store a routing table to be used for routing packets. Baseband processor 806 may perform operations to generate the radio frequency signals for transmission or retransmission by both transceivers 810 and 812. Baseband processor 806 may also perform operations to decode signals received by transceivers 812 and 814. Baseband processor 806 may use memory 808 to perform these tasks.

The first radio transceiver 812 may be a radio transceiver capable of providing LTE eNodeB functionality, and may be capable of higher power and multi-channel OFDMA. The second radio transceiver 814 may be a radio transceiver capable of providing LTE UE functionality. Both transceivers 812 and 814 may be capable of receiving and transmitting on one or more LTE bands. In some embodiments, either or both of transceivers 812 and 814 may be capable of providing both LTE eNodeB and LTE UE functionality. Transceiver 812 may be coupled to processor 802 via a Peripheral Component Interconnect-Express (PCI-E) bus, and/or via a daughtercard. As transceiver 814 is for providing LTE UE functionality, in effect emulating a user equipment, it may be connected via the same or different PCI-E bus, or by a USB bus, and may also be coupled to SIM card 818. First transceiver 812 may be coupled to first radio frequency (RF) chain (filter, amplifier, antenna) 822, and second transceiver 814 may be coupled to second RF chain (filter, amplifier, antenna) 824.

SIM card 818 may provide information required for authenticating the simulated UE to the evolved packet core (EPC). When no access to an operator EPC is available, a local EPC may be used, or another local EPC on the network may be used. This information may be stored within the SIM card, and may include one or more of an international mobile equipment identity (IMEI), international mobile subscriber identity (IMSI), or other parameter needed to identify a UE. Special parameters may also be stored in the SIM card or provided by the processor during processing to identify to a target eNodeB that device 800 is not an ordinary UE but instead is a special UE for providing backhaul to device 800.

Wired backhaul or wireless backhaul may be used. Wired backhaul may be an Ethernet-based backhaul (including Gigabit Ethernet), or a fiber-optic backhaul connection, or a cable-based backhaul connection, in some embodiments. Additionally, wireless backhaul may be provided in addition to wireless transceivers 812 and 814, which may be Wi-Fi 802.11a/b/g/n/ac/ad/ah, Bluetooth, ZigBee, microwave (including line-of-sight microwave), or another wireless backhaul connection. Any of the wired and wireless connections described herein may be used flexibly for either access (providing a network connection to UEs) or backhaul (providing a mesh link or providing a link to a gateway or core network), according to identified network conditions and needs, and may be under the control of processor 802 for reconfiguration.

A GPS module 830 may also be included, and may be in communication with a GPS antenna 832 for providing GPS coordinates and/or timing information, which is used for synchronizing the eNodeB with the network in some embodiments. When mounted in a vehicle, the GPS antenna may be located on the exterior of the vehicle pointing upward, for receiving signals from overhead without being blocked by the bulk of the vehicle or the skin of the vehicle. Automatic neighbor relations (ANR) module 832 may also be present and may run on processor 802 or on another processor, or may be located within another device, according to the methods and procedures described herein.

Other elements and/or modules may also be included, such as a home eNodeB, a local gateway (LGW), a self-organizing network (SON) module, or another module. Additional radio amplifiers, radio transceivers, radio arrays, radio filters or other components, and/or wired network connections may also be included.

Figure 9:
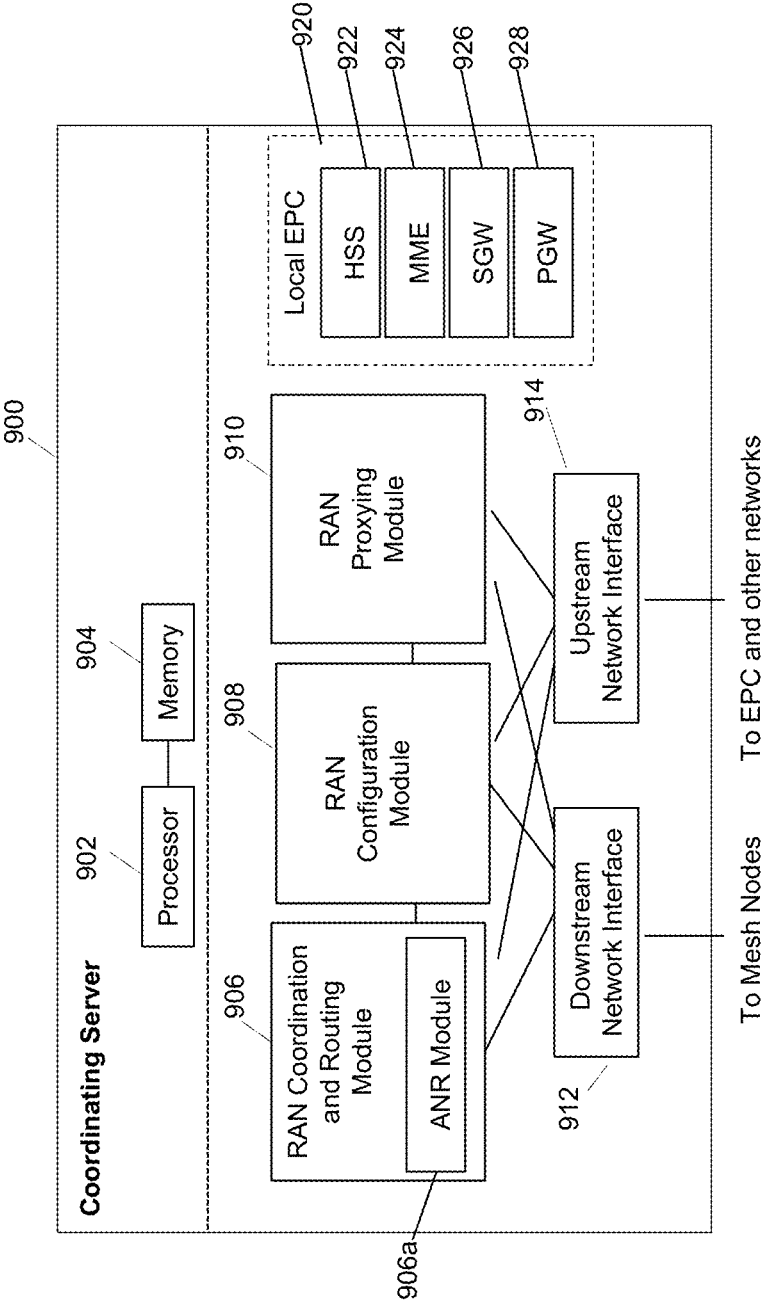
FIG. 9 shows a coordinating server for providing services and performing methods as described herein, in accordance with some embodiments.

FIG. 9 shows a coordinating server for providing services and performing methods as described herein, in accordance with some embodiments. Coordinating server 900 includes processor 902 and memory 904, which are configured to provide the functions described herein. Also present are radio access network coordination/routing (RAN Coordination and routing) module 906, including ANR module 906*a*, RAN configuration module 908, and RAN proxying module 910. The ANR module 906*a* may perform the ANR tracking, PCI disambiguation, ECGI requesting, and GPS coalescing and tracking as described herein, in coordination with RAN coordination module 906 (e.g., for requesting ECGIs, etc.). In some embodiments, coordinating server 900 may coordinate multiple RANs using coordination module 906. In some embodiments, coordination server may also provide proxying, routing virtualization and RAN virtualization, via modules 910 and 908. In some embodiments, a downstream network interface 912 is provided for interfacing with the RANs, which may be a radio interface (e.g., LTE), and an upstream network interface 914 is provided for interfacing with the core network, which may be either a radio interface (e.g., LTE) or a wired interface (e.g., Ethernet).

Coordinator 900 includes local evolved packet core (EPC) module 920, for authenticating users, storing and caching priority profile information, and performing other EPC-dependent functions when no backhaul link is available. Local EPC 920 may include local HSS 922, local MME 924, local SGW 926, and local PGW 928, as well as other modules. Local EPC 920 may incorporate these modules as software modules, processes, or containers. Local EPC 920 may alternatively incorporate these modules as a small number of monolithic software processes. Modules 906, 908, 910 and local EPC 920 may each run on processor 902 or on another processor, or may be located within another device.

In any of the scenarios described herein, where processing may be performed at the cell, the processing may also be performed in coordination with a cloud coordination server. A mesh node may be an eNodeB. An eNodeB may be in communication with the cloud coordination server via an X2 protocol connection, or another connection. The eNodeB may perform inter-cell coordination via the cloud communication server when other cells are in communication with the cloud coordination server. The eNodeB may communicate with the cloud coordination server to determine whether the UE has the ability to support a handover to Wi-Fi, e.g., in a heterogeneous network.

Although the methods above are described as separate embodiments, one of skill in the art would understand that it would be possible and desirable to combine several of the above methods into a single embodiment, or to combine disparate methods into a single embodiment. For example, all of the above methods could be combined. In the scenarios where multiple embodiments are described, the methods could be combined in sequential order, or in various orders as necessary.

Although the above systems and methods for providing interference mitigation are described in reference to the Long Term Evolution (LTE) standard, one of skill in the art would understand that these systems and methods could be adapted for use with other wireless standards or versions thereof. The inventors have understood and appreciated that the present disclosure could be used in conjunction with various network architectures and technologies. Wherever a 4G technology is described, the inventors have understood that other RATs have similar equivalents, such as a gNodeB for 5G equivalent of eNB. Wherever an MME is described, the MME could be a 3G RNC or a 5G AMF/SMF. Additionally, wherever an MME is described, any other node in the core network could be managed in much the same way or in an equivalent or analogous way, for example, multiple connections to 4G EPC PGWs or SGWs, or any other node for any other RAT, could be periodically evaluated for health and otherwise monitored, and the other aspects of the present disclosure could be made to apply, in a way that would be understood by one having skill in the art.

Additionally, the inventors have understood and appreciated that it is advantageous to perform certain functions at a coordination server, such as the Parallel Wireless HetNet Gateway, which performs virtualization of the RAN towards the core and vice versa, so that the core functions may be statefully proxied through the coordination server to enable the RAN to have reduced complexity. Therefore, at least four scenarios are described: (1) the selection of an MME or core node at the base station; (2) the selection of an MME or core node at a coordinating server such as a virtual radio network controller gateway (VRNCGW); (3) the selection of an MME or core node at the base station that is connected to a 5G-capable core network (either a 5G core network in a 5G standalone configuration, or a 4G core network in 5G non-standalone configuration); (4) the selection of an MME or core node at a coordinating server that is connected to a 5G-capable core network (either 5G SA or NSA). In some embodiments, the core network RAT is obscured or virtualized towards the RAN such that the coordination server and not the base station is performing the functions described herein, e.g., the health management functions, to ensure that the RAN is always connected to an appropriate core network node. Different protocols other than S1AP, or the same protocol, could be used, in some embodiments.

In some embodiments, the base stations described herein may support Wi-Fi air interfaces, which may include one or more of IEEE 802.11a/b/g/n/ac/af/p/h. In some embodiments, the base stations described herein may support IEEE 802.16 (WiMAX), to LTE transmissions in unlicensed frequency bands (e.g., LTE-U, Licensed Access or LA-LTE), to LTE transmissions using dynamic spectrum access (DSA), to radio transceivers for ZigBee, Bluetooth, or other radio frequency protocols, or other air interfaces.

In some embodiments, the software needed for implementing the methods and procedures described herein may be implemented in a high level procedural or an object-oriented language such as C, C++, C#, Python, Java, or Perl. The software may also be implemented in assembly language if desired. Packet processing implemented in a network device can include any processing determined by the context. For example, packet processing may involve high-level data link control (HDLC) framing, header compression, and/or encryption. In some embodiments, software that, when executed, causes a device to perform the methods described herein may be stored on a computer-readable medium such as read-only memory (ROM), programmable-read-only memory (PROM), electrically erasable programmable-read-only memory (EEPROM), flash memory, or a magnetic disk that is readable by a general or special purpose-processing unit to perform the processes described in this document. The processors can include any microprocessor (single or multiple core), system on chip (SoC), microcontroller, digital signal processor (DSP), graphics processing unit (GPU), or any other integrated circuit capable of processing instructions such as an x86 microprocessor.

In some embodiments, the radio transceivers described herein may be base stations compatible with a Long Term Evolution (LTE) radio transmission protocol or air interface. The LTE-compatible base stations may be eNodeBs. In addition to supporting the LTE protocol, the base stations may also support other air interfaces, such as UMTS/HSPA, CDMA/CDMA2000, GSM/EDGE, GPRS, EVDO, 2G, 3G, 5G, TDD, or other air interfaces used for mobile telephony.

In some embodiments, the base stations described herein may support Wi-Fi air interfaces, which may include one or more of IEEE 802.11a/b/g/n/ac/af/p/h. In some embodiments, the base stations described herein may support IEEE 802.16 (WiMAX), to LTE transmissions in unlicensed frequency bands (e.g., LTE-U, Licensed Access or LA-LTE), to LTE transmissions using dynamic spectrum access (DSA), to radio transceivers for ZigBee, Bluetooth, or other radio frequency protocols, or other air interfaces.

The foregoing discussion discloses and describes merely exemplary embodiments of the present invention. In some embodiments, software that, when executed, causes a device to perform the methods described herein may be stored on a computer-readable medium such as a computer memory storage device, a hard disk, a flash drive, an optical disc, or the like. As will be understood by those skilled in the art, the present invention may be embodied in other specific forms without departing from the spirit or essential characteristics thereof. For example, wireless network topology can also apply to wired networks, optical networks, and the like. The methods may apply to LTE-compatible networks, to UMTS-compatible networks, or to networks for additional protocols that utilize radio frequency data transmission. Various components in the devices described herein may be added, removed, split across different devices, combined onto a single device, or substituted with those having the same or similar functionality.

Although the present disclosure has been described and illustrated in the foregoing example embodiments, it is understood that the present disclosure has been made only by way of example, and that numerous changes in the details of implementation of the disclosure may be made without departing from the spirit and scope of the disclosure, which is limited only by the claims which follow. Various components in the devices described herein may be added, removed, or substituted with those having the same or similar functionality. Various steps as described in the figures and specification may be added or removed from the processes described herein, and the steps described may be performed in an alternative order, consistent with the spirit of the invention. Features of one embodiment may be used in another embodiment.

The invention claimed is:

1. A method for providing optimized S1-X2 handovers, comprising:
   establishing an X2 interface association between a virtual node (VNODE) and an X2 interface gateway (X2GW);
   receiving, at the X2GW, a S1 interface application protocol (S1AP) Handover Required message from a VNODE;
   obtaining, by the X2GW, virtual node (VNODE) serving cell information from the S1AP Handover Required message; and
   initiating, by the X2GW, X2 association setup with a core side handover target node using the obtained VNODE serving cell information,
   wherein the X2GW is situated between the VNODE and a mobility management entity (MME) for the core side handover target node.

2. The method of claim 1, wherein the VNODE is an eNodeB and wherein the core side handover target node is an eNodeB.

3. The method of claim 1, wherein the neighbor information is one of a Physical Cell Identity/Identifier (PCI) or an E-UTRA Absolute Radio Frequency Number (EARFN) of the serving cell, and further comprising sending an X2 setup request to the core side handover target node using the neighbor information.

4. The method of claim 1, further comprising obtaining a target node PCI and a target node EARFN, and sending an X2 setup request to the core side handover target node using the target node PCI and target node EARFN.

5. The method of claim 1, further comprising initiating, by the X2GW via a mobility management entity (MME) in a core network, X2 association setup with a core side handover target node using the obtained VNODE serving cell information.

6. A non-transitory computer-readable medium comprising instructions, which, when executed by a processor at an X2 interface gateway (X2GW), cause the X2GW to perform steps, the steps further comprising:

> establishing an X2 interface association between a virtual node (VNODE) and an X2 interface gateway (X2GW);
>
> receiving, at the X2GW, a S1 interface application protocol (S1AP) Handover Required message from a VNODE;
>
> obtaining, by the X2GW, virtual node (VNODE) serving cell information from the S1AP Handover Required message; and > initiating, by the X2GW, X2 association setup with a core side handover target node using the obtained VNODE serving cell information,
>
> wherein the X2GW is situated between the VNODE and a mobility management entity (MME) for the core side handover target node.

7. The non-transitory computer-readable medium of claim 6, wherein the VNODE is an eNodeB and wherein the core side handover target node is an eNodeB.

8. The non-transitory computer-readable medium of claim 6, wherein the neighbor information is one of a PCI or an EARFN of the serving cell, and the instructions further comprising sending an X2 setup request to the core side handover target node using the neighbor information.

9. The non-transitory computer-readable medium of claim 6, the instructions further comprising obtaining a target node PCI and a target node EARFN, and sending an X2 setup request to the core side handover target node using the target node PCI and target node EARFN.

10. The non-transitory computer-readable medium of claim 6, the instructions further comprising initiating, by the X2GW via a mobility management entity (MME) in a core network, X2 association setup with a core side handover target node using the obtained VNODE serving cell information.

* * * * *